United States Patent [19]

Dunklau

[11] Patent Number: 5,033,916
[45] Date of Patent: Jul. 23, 1991

[54] HIGH-SPEED MILLING OR DRILLING HEADS

[75] Inventor: Claus Dunklau, Esslingen-Neckar, Fed. Rep. of Germany

[73] Assignee: Feldmuehle Aktiengesellschaft, Duesseldorf, Fed. Rep. of Germany

[21] Appl. No.: 299,828

[22] PCT Filed: Apr. 28, 1988

[86] PCT No.: PCT/EP88/00358
§ 371 Date: Mar. 6, 1989
§ 102(e) Date: Mar. 6, 1989

[87] PCT Pub. No.: WO88/08767
PCT Pub. Date: Nov. 17, 1988

[30] Foreign Application Priority Data

May 8, 1987 [DE] Fed. Rep. of Germany ....... 3715338

[51] Int. Cl.$^5$ .............................................. B26D 1/12
[52] U.S. Cl. ........................................ 407/33; 407/40; 407/34; 407/107
[58] Field of Search ................. 407/40, 33, 34, 46, 407/47, 49, 102, 107

[56] References Cited

U.S. PATENT DOCUMENTS

| | | | |
|---|---|---|---|
| 1,411,799 | 4/1922 | Miller | 29/105 |
| 1,919,352 | 7/1933 | Albright | 407/33 |
| 2,309,410 | 1/1943 | Miller | 407/33 |
| 3,754,309 | 8/1973 | Jones et al. | 407/107 |

Primary Examiner—Frederick R. Schmidt
Assistant Examiner—Lawrence Cruz
Attorney, Agent, or Firm—Felfe & Lynch

[57] ABSTRACT

High speed milling or drilling tool of the type including a rotatable head which carries several circumferentially arranged cutting insert holders for reversible cutting inserts retained by dogs. Each insert has a pair of parallel top surfaces bounded by four orthogonal end surfaces, two of which are received against perpendicular sidewalls in an open pocket of the holder. Each top surface has at least one pair of elongate clamping indentations which are formed as surfaces of rotation and lie at a like angle $\beta$ to the adjacent end surface of the insert.

16 Claims, 8 Drawing Sheets

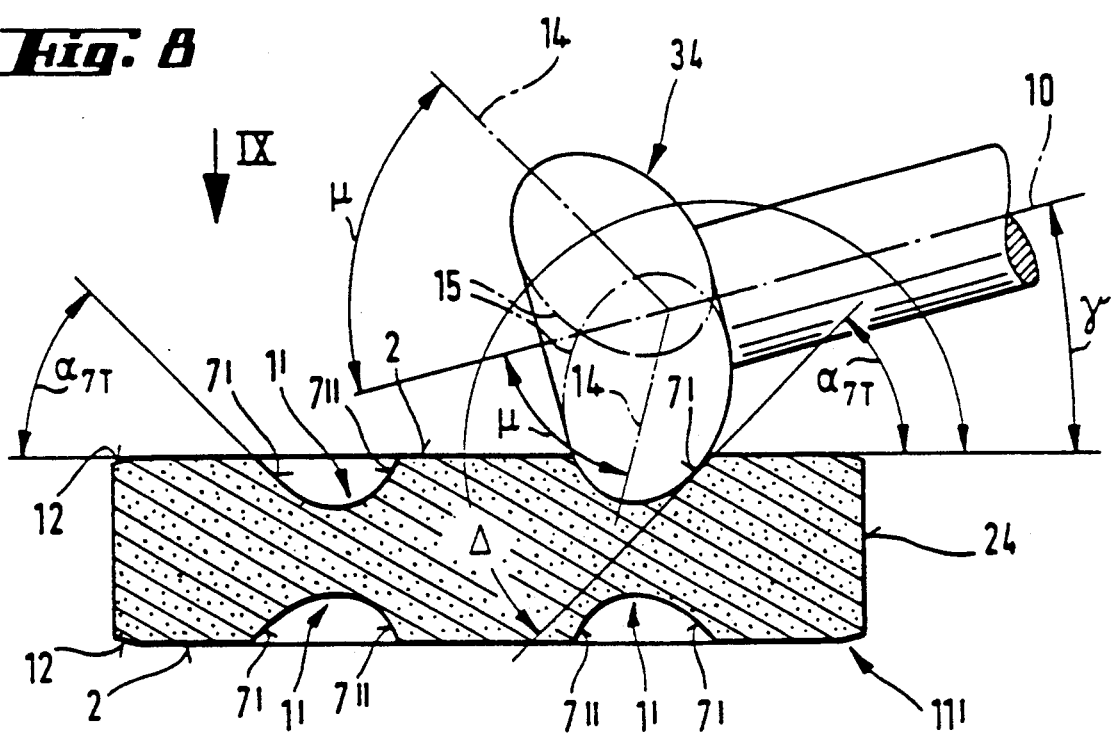
_Fig. 8_
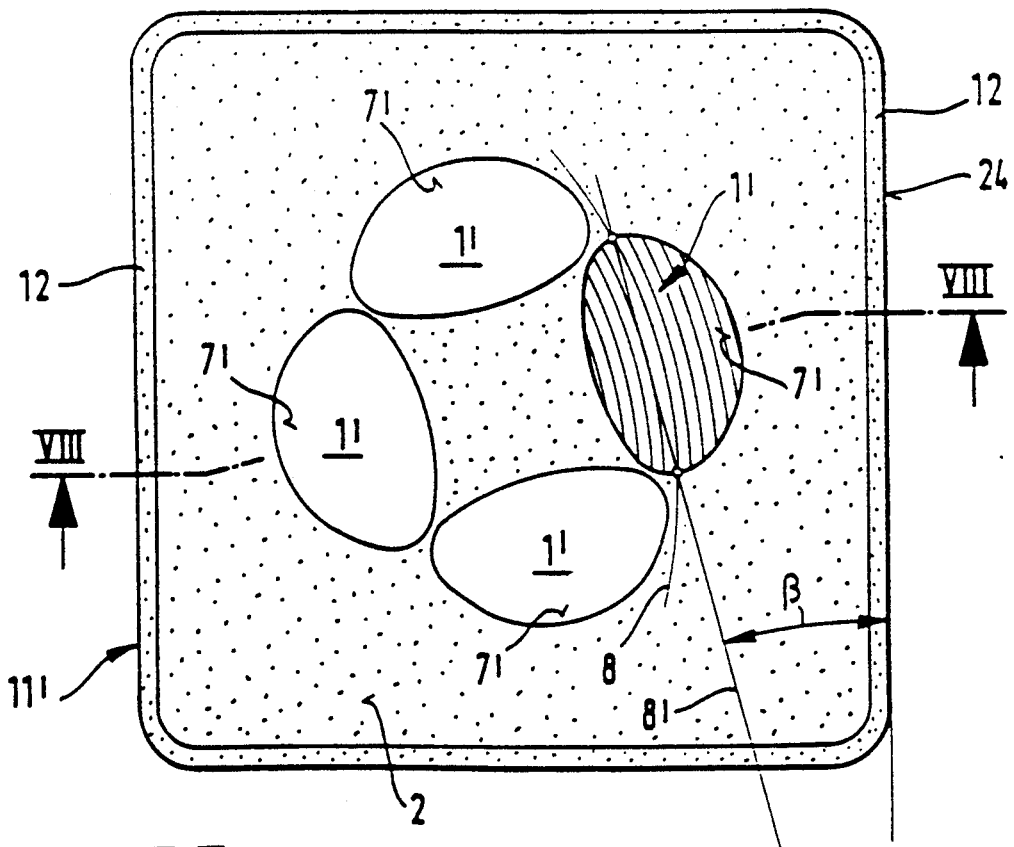
_Fig. 9_

HIGH-SPEED MILLING OR DRILLING HEADS

BACKGROUND OF THE INVENTION

The invention relates to a high-speed milling or drilling heads with a holder adjustably mounted in it for reversible cutting inserts which contain at least one clamping indentation in each of two parallel top surfaces.

Milling or drilling heads are increasingly being equipped with reversible ceramic cutting inserts to as to make full use of the inserts at the high cutting speeds which these cutting inserts permit. Combined with a specific cutting edge design, these high cutting speeds result in surfaces which are nearly as good as ground surfaces, so that machining with ceramic cutting inserts, and to a limited extent also with metal carbide cutting inserts, makes it possible to eliminate one operation.

On account of the high rotatory speeds and the resultant high circumferential speeds, the clamping means must satisfy stringent requirements, since the secure seating of the cutting insert in the clamping means is no longer assured, on account of the centrifugal forces that are produced. In the case of wheel mills, therefore, use has been made, as disclosed in DE-GM 85 03 545, of perforated cutting inserts of conventional type, which have in the center of their adjacent free surface a perforation which is provided with a recess which is engaged by the clamping means and exercises a pressure against the surfaces of the seat of the insert on the wheel body. Aside from the fact that the required stability, especially at high rotatory speeds, and when the cutterhead comes in contact with the workpiece, is not provided, these perforated cutting inserts have a greater tendency to crack. In DE-GM 85 27 925, therefore, it is proposed to provide a clamping indentation on one side in the cutting insert, the indentation having a trapezoidal shape in longitudinal section and a triangular shape in cross section, or is disposed in the form of truncatoconical countersink. This clamping indentation too is disposed in the adjacent surface, which has the size necessary for the purpose. The depth of the indentation in this case corresponds substantially to half the thickness of the cutting insert.

DE-OS 25 49 757 discloses a wheel mill in the form of a copying cutterhead which consists of a plurality of disks, in which the disk recesses disposed therein serve each to accommodate a reversible cutting insert and a clamping body. The reversible cutting insert can be a perforated cutting insert and in this case is secured by a setscrew which enters into the central hole in the clamping plate, but recesses can also be created in the top surfaces of the reversible cutting insert so as to be engaged by the projections of the clamping wedge and of the disk recesses, respectively. Adjustment of a cutting insert of this kind is not possible, since it does not have a separate holder which can be adjusted in the cutterhead.

In cutterheads which are designed for planing, and boring cutterheads designed for spindling out, the requirements are completely different from those of wheel mills, i.e., the cutting inserts have adjacent free surfaces whose dimensions are insufficient for clamping and in which no depressions can be created to accommodate clamping elements without the danger of damaging the cutting edges.

SUMMARY OF THE INVENTION

It is therefore the purpose of the present invention, in high-speed milling or boring cutterheads, especially those which operate with a circumferential velocity of more than 250 meters per second, to provide for a mounting of the cutting inserts which will assure that the cutting inserts will remain in the desired position during the working cycle, and furthermore will not be damaged or destroyed by thermal effects.

This purpose is accomplished in a tool having a cutting insert received in a pocket in the holder, the insert having a pair of parallel top surfaces and four orthogonal end surfaces. One of the top surfaces is received against the bottom of the pocket, and two perpendicular end surfaces are received against sidewalls of the pocket, the insert being held in the pocket by a clamping dog which bears against an indentation in the insert.

Each insert has in each top surface at least one elongate clamping indentation formed as a surface of rotation having a plane of symmetry and a longitudinal axis perpendicular to the plane of symmetry. The invention utilizes the phenomenon of self-locking for the purpose of holding the cutting insert in its prescribed position, and in addition it is brought about by a specific angular configuration that the cutting insert will be positively drawn against the abutment when the clamping dog is tightened, and will remain in this position even at high circumferential velocities.

BRIEF DESCRIPTION OF THE DRAWINGS

FIG. 8 is a side view of a cutting insert in cross section, showing the solid of revolution in phantom, FIG. 9 is a top view of the cutting insert of FIG. 8.

DETAILED DESCRIPTION OF THE PREFERRED EMBODIMENT

Figure 1:
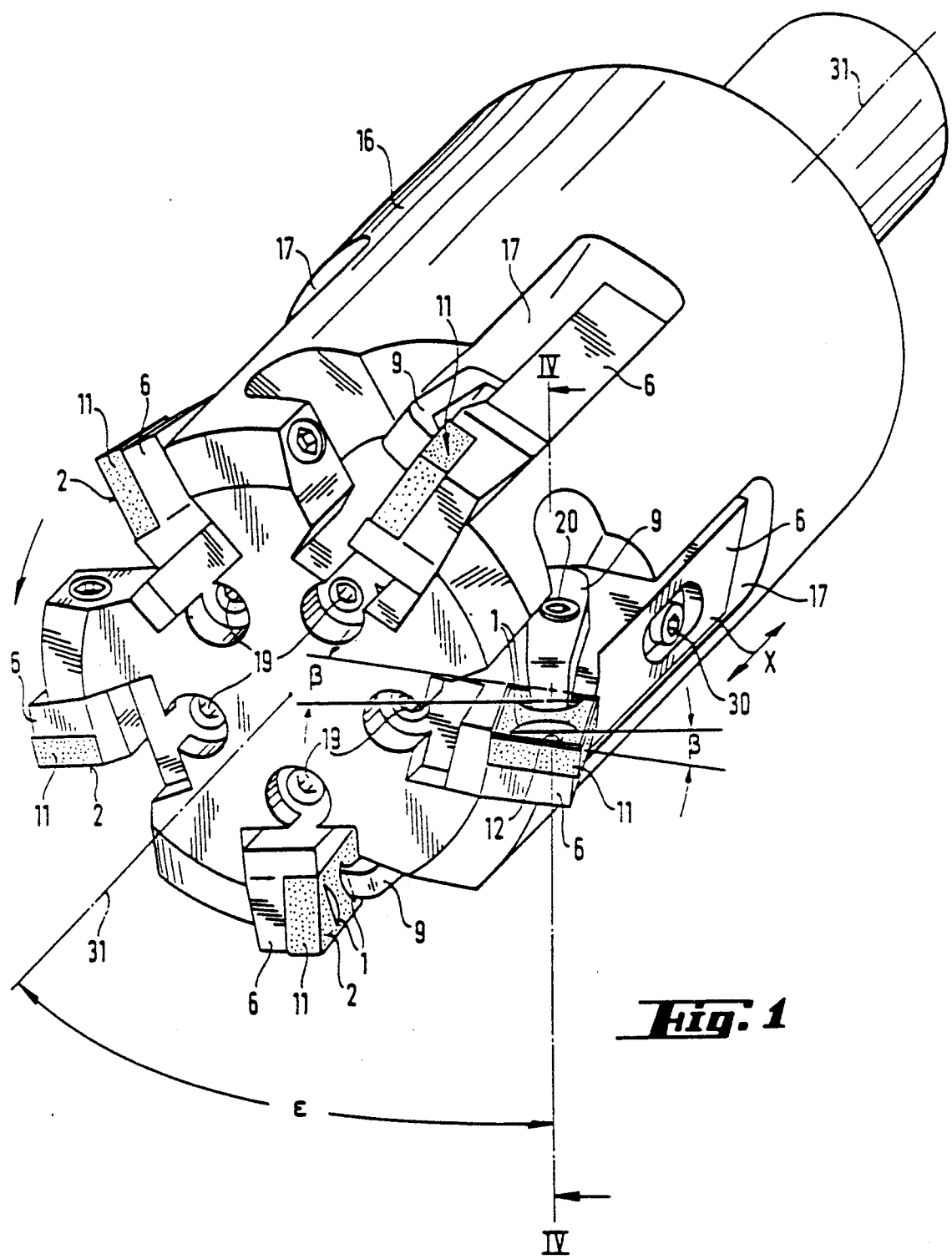
FIG. 1 is a perspective drawing of a cutterhead.

The cutterhead consists of a body 16 which has channels 17 in which the holders 6 which accommodate the cutting inserts 11 are mounted with holding screws 30. The holders 6 can be positioned by means of adjusting screws 19. The dog 9 is fastened on the holder 6 by a clamping screw 20; its tooth 21 enters into an indentation 1 in the cutting insert 11 and, when the clamping screw 20 is tightened, draws the orthogonal end surfaces 24 of the cutting insert 11 against perpendicular sidewalls 22 and 23 of a pocket in the holder. The cutting insert 11 is thereby substantially aligned.

Figure 2:
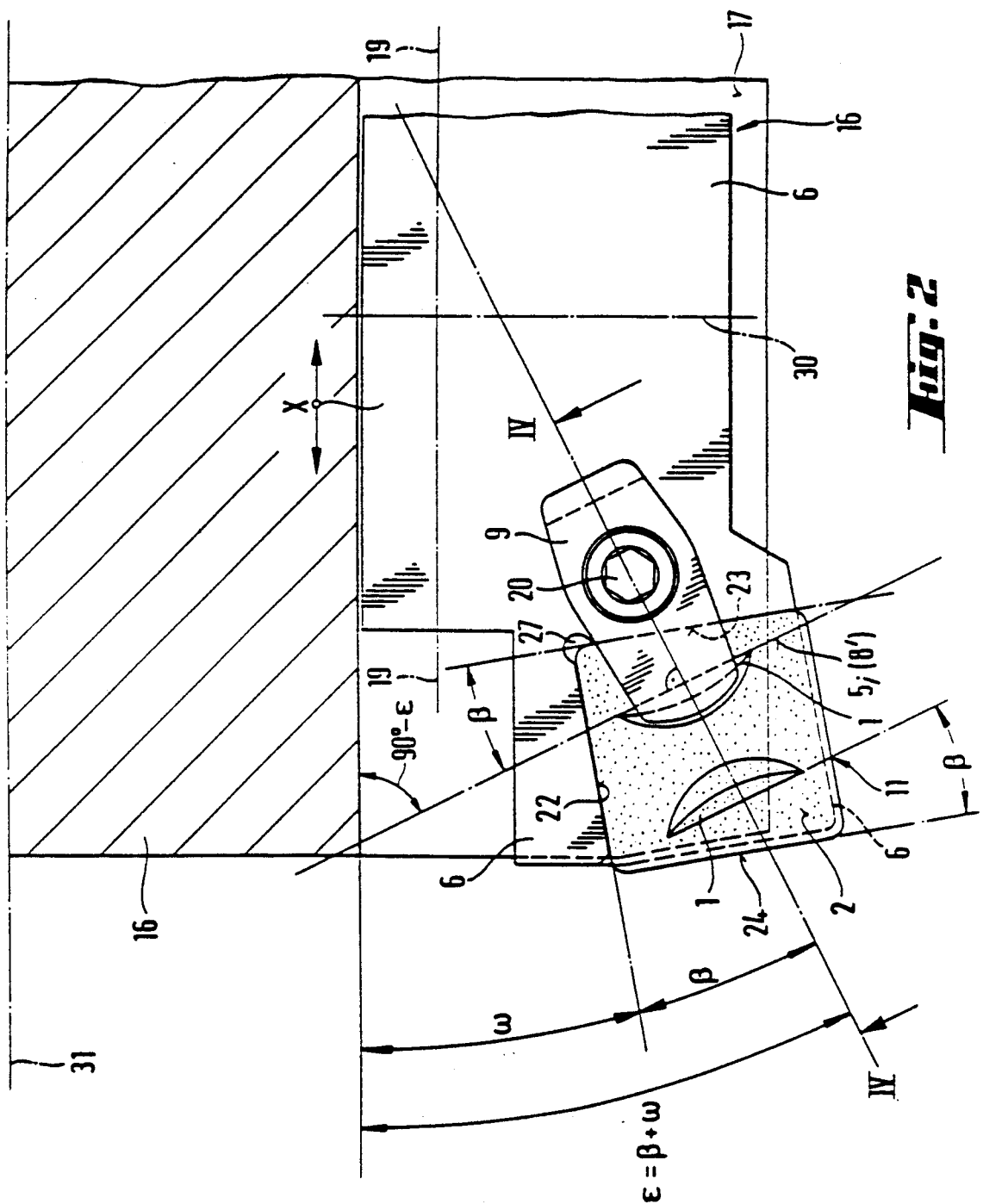
FIG. 2 is a top view of a detail of the cutterhead showing a clamping means thereof.
Figure 3:
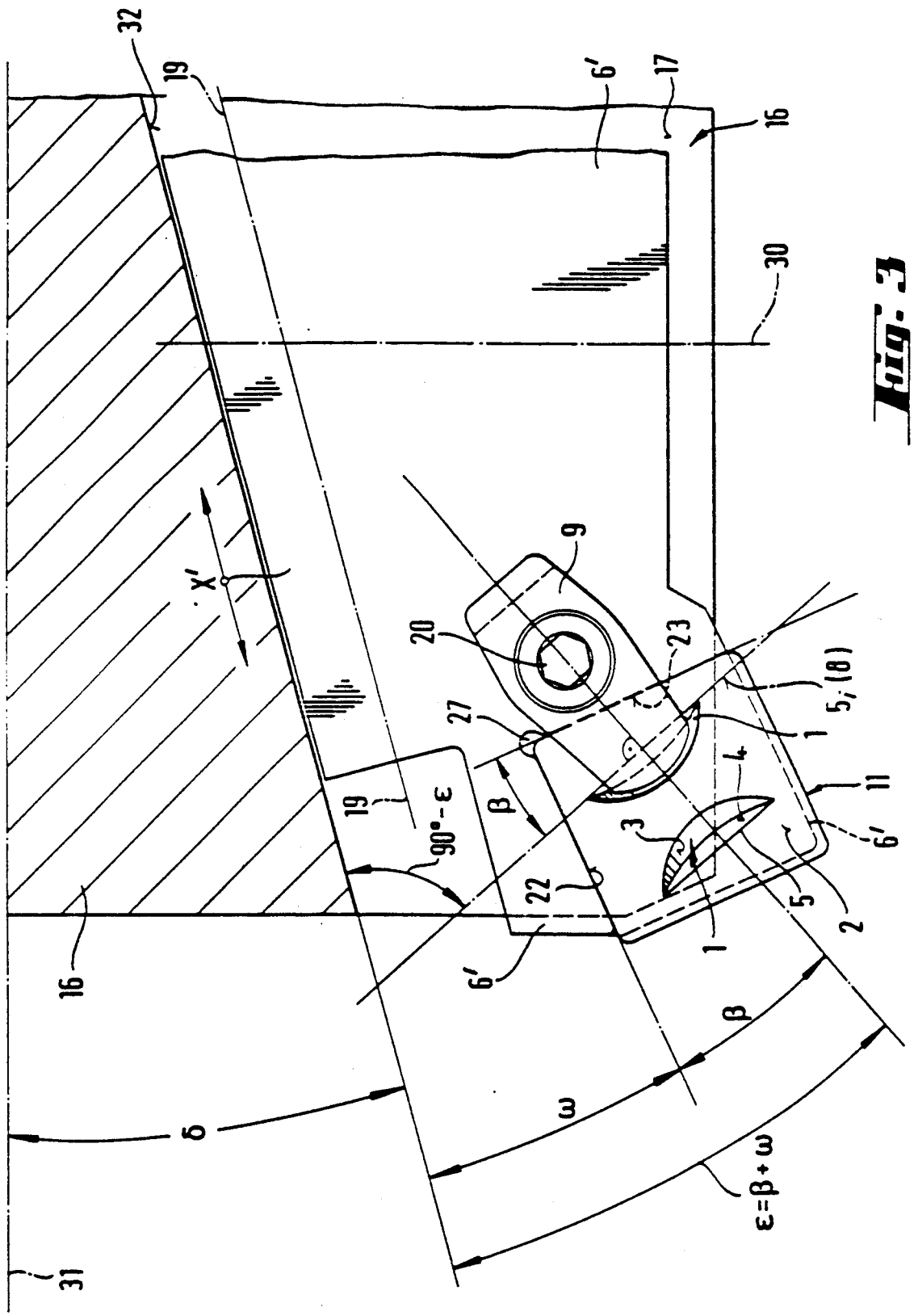
FIG. 3 is a top view of a clamping means set at an angle.
Figure 4:
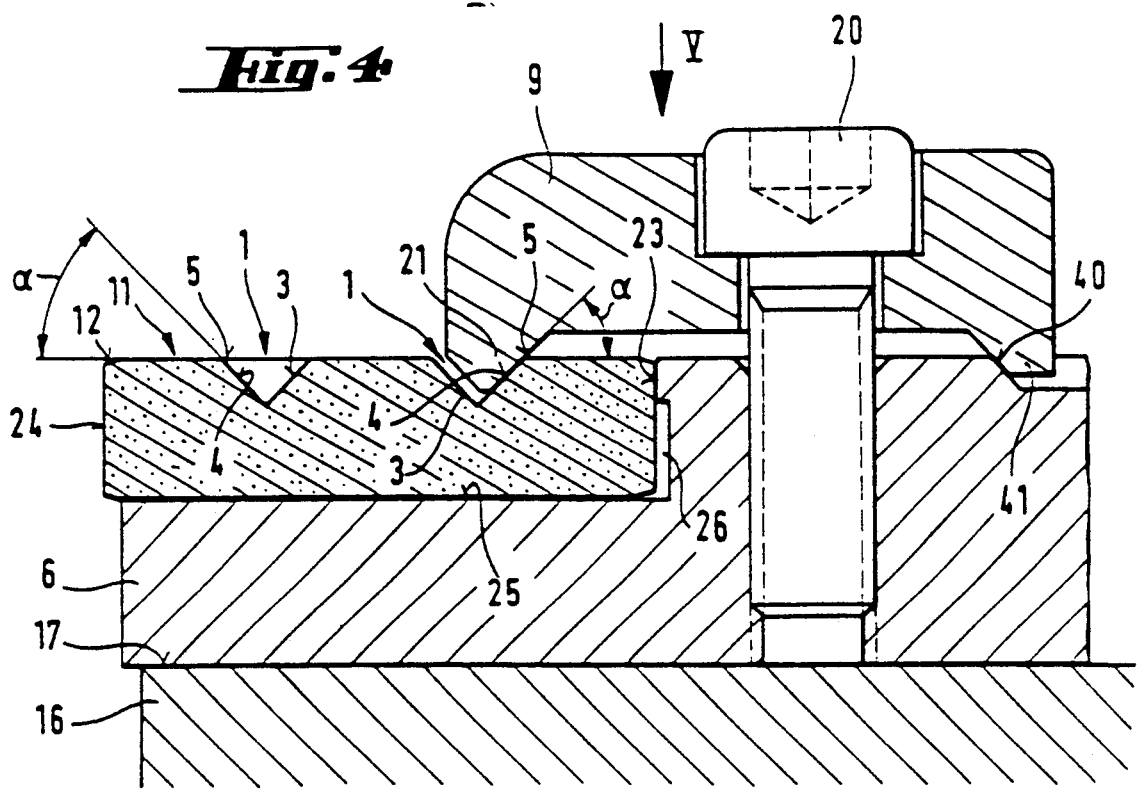
FIG. 4 is an enlarged side view of a cutting insert in the holder.
Figure 5:
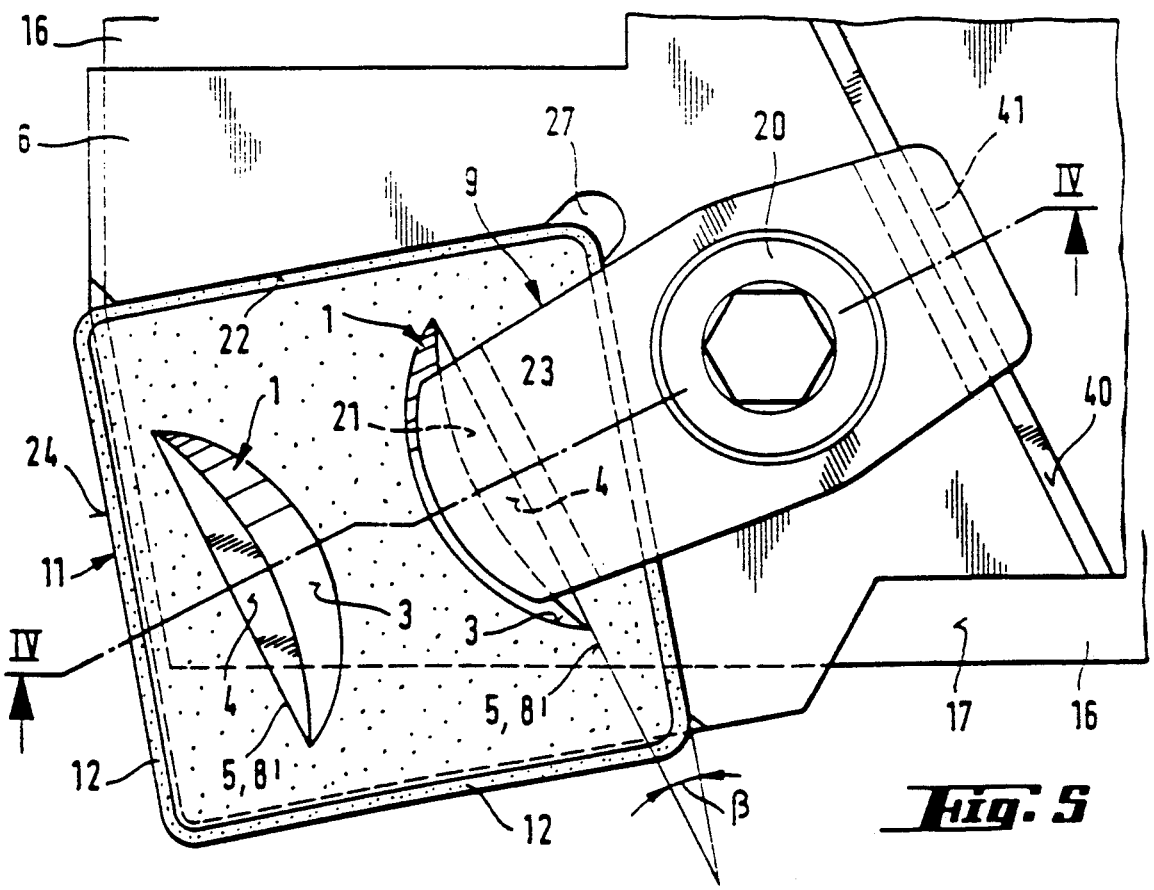
FIG. 5 is a top view of the holder shown in FIG. 4.
Figure 6:
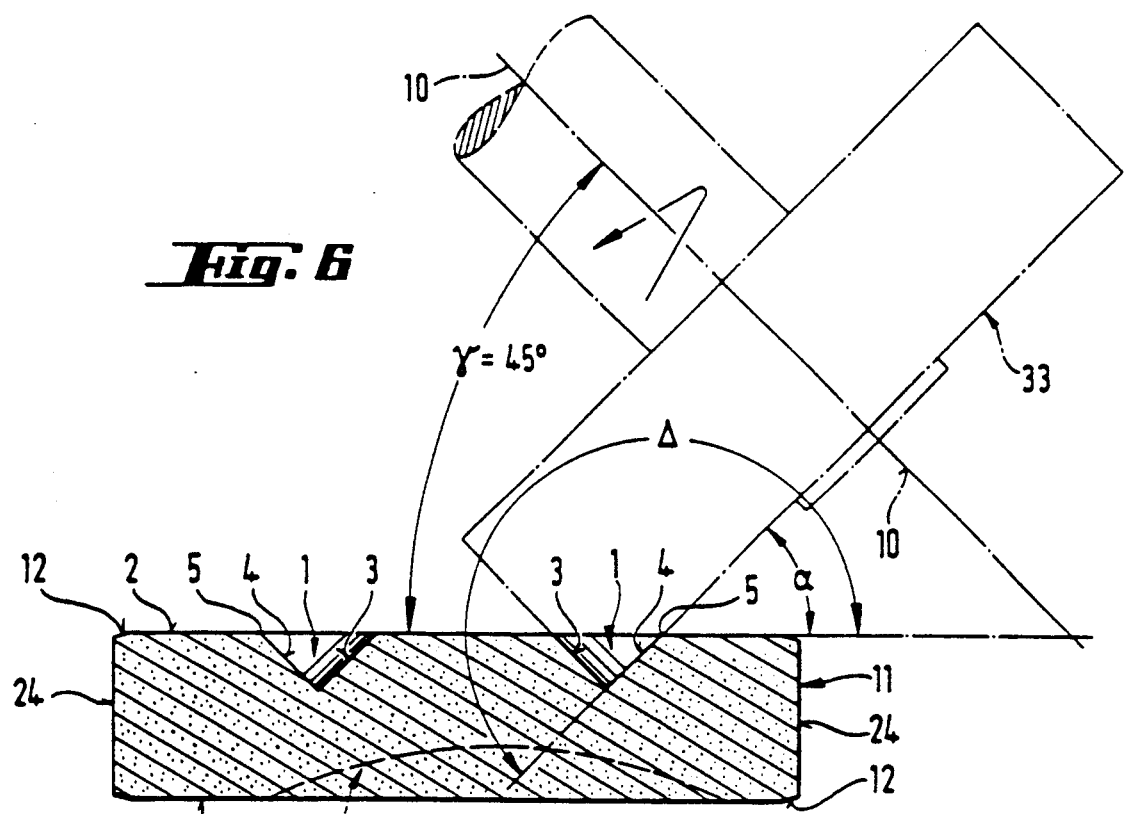
FIG. 6 is a side view of the cutting insert according to FIG. 5 in section, showing the solid of revolution in phantom.

The clamping indentations 1 are, as shown in the figures, disposed in the top surfaces 2 of the cutting insert 11 and have the shape of a section of a surface of revolutions formed by of a solid of revolution. As shown in FIG. 6, the solid of revolution rotating about the axis 10 is a cylinder 33 by which a curved surface 3 and a planar clamping surface in the form of a section 4 of a circle is formed. The secant 5 of the sector 4 runs at an angle $\beta$ to the adjacent end surface 24, which is between 13° and 32°, and at an angle of 90°−$\epsilon$, to the direction of movement X$\epsilon$ being the angle sum of the angles B and between the direction of movement X and the end surface 24 adjacent thereto. In FIG. 2 an angle B of 16° is represented.

The circular section 4 of the clamping indentation 1 is inclined at an angle $\alpha$ of 15 to 45° to the top surface 2. In FIG. 6, this angle $\alpha$ is 45°. Thus the magnitude of the angle $\Delta$, which the two surfaces, i.e., the top surface 2 and the circular section 4, form with one another, is between 195° and 225°. In FIG. 6, this angle $\Delta$ is represented as an angle of 225°.

In the case of the embodiment shown in FIG. 8, the clamping indentation 1 is formed by an ellipsoid 34 which develops by rotation of the ellipse 15 about an axis 10 which is inclined at an angle to the top surface 2 of the cutting insert. The axis 14 of the ellipse is inclined at an angle $\mu$ to the axis of rotation 10, resulting in the angle $\alpha_{7T}$ at the clamping indentation. The longitudinal axis 8 of the corresponding clamping indentation 1' therefore has the shape of a shallow arc, while a connecting line 8' through the intersection of the arc 8 with the top surface 2 of the cutting insert 11 is at the same angle $\beta$ as the secant 5 of the sector 4 described in FIGS. 6 and 7. For the sake of simplicity, however, it has been assumed in the patent application that this arc, i.e., the longitudinal axis 8 of the clamping indentation 1, is a straight line running at the angle $\beta$. In both cases this axis is perpendicular to the plane of symmetry of the surface of revolution.

As seen in FIGS. 4 to 12, the cutting insert 11 is provided with a relieved edge 12 forming the transition from the top surfaces 2 to the end surfaces 24. Two of these end surfaces 24 lie against the sidewalls or abutments 22 and 23, contact being made only in the upper third, and a clearance 26 runs down to the bed 25, assuring that the cutting insert 11 will lie without chattering on the bed 25 forming the bottom surface of the recess 27 in the adjustable holder 6.

Figure 10:
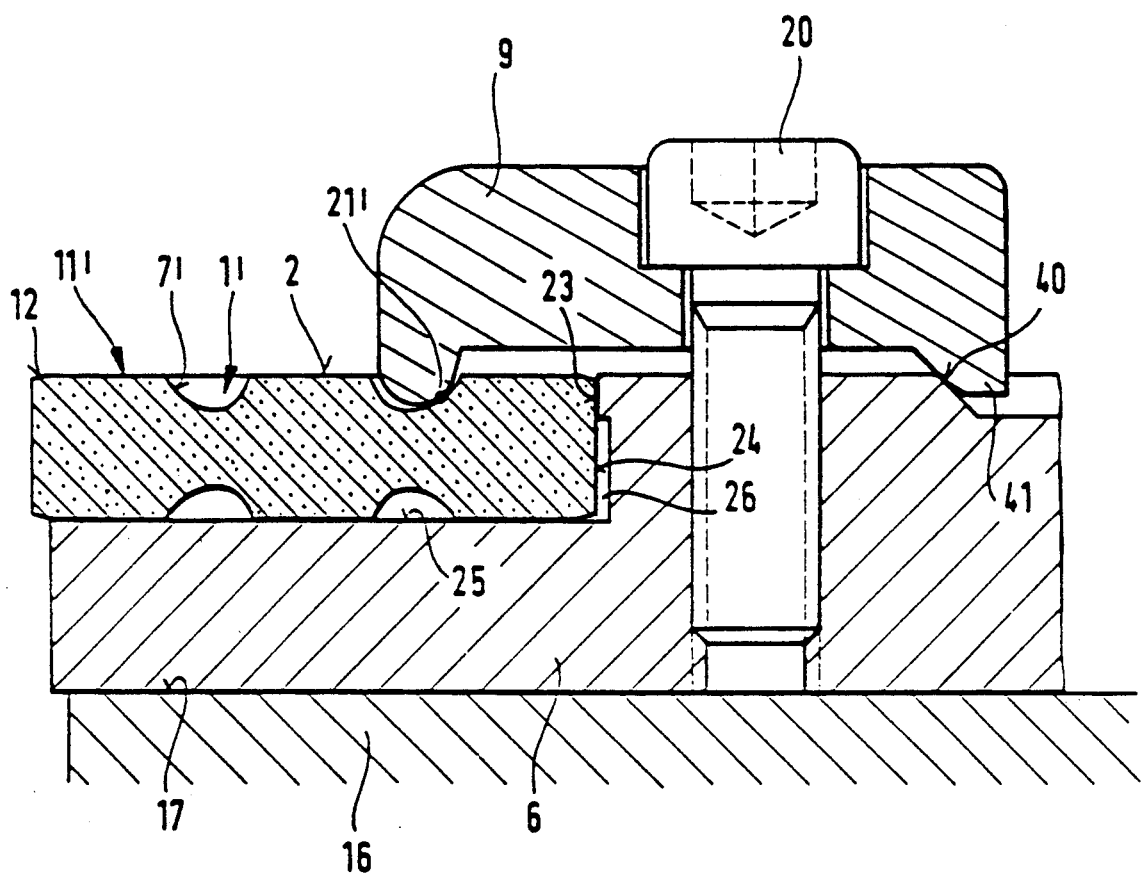
FIG. 10 is a side view of a holder and clamping dog for cutting inserts according to FIG. 9.

FIG. 10, which shows a cutting insert in accordance with FIGS. 8 and 9, shows that a point contact exists between the claw 21' of the dog 9 and the surface of revolution forming the clamping indentation. By tightening the clamping screw 20 the dog 9 is lowered so that its rearward end 41 is forced against the ramp 40 on holder 6, thereby displacing it rearwardly and thus drawing the cutting insert 11 with its end surface 24 against the abutment 23.

Figure 11:
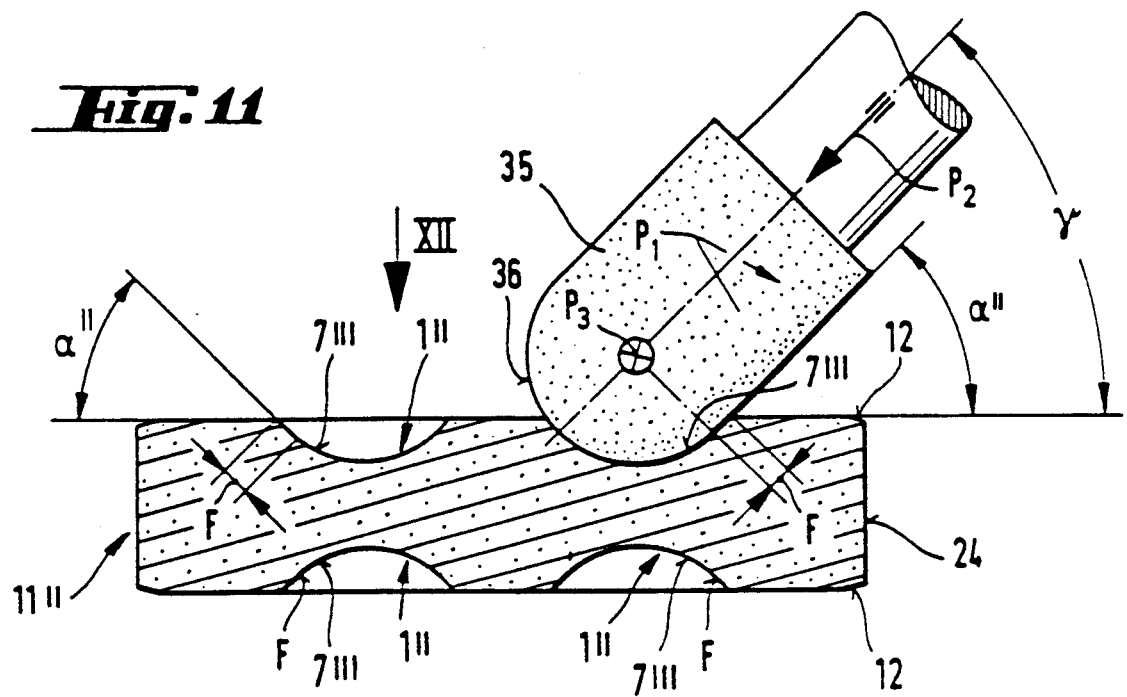
FIG. 11 is a side view in cross section of another form of cutting insert showing the solid of revolution in the same manner.
Figure 12:
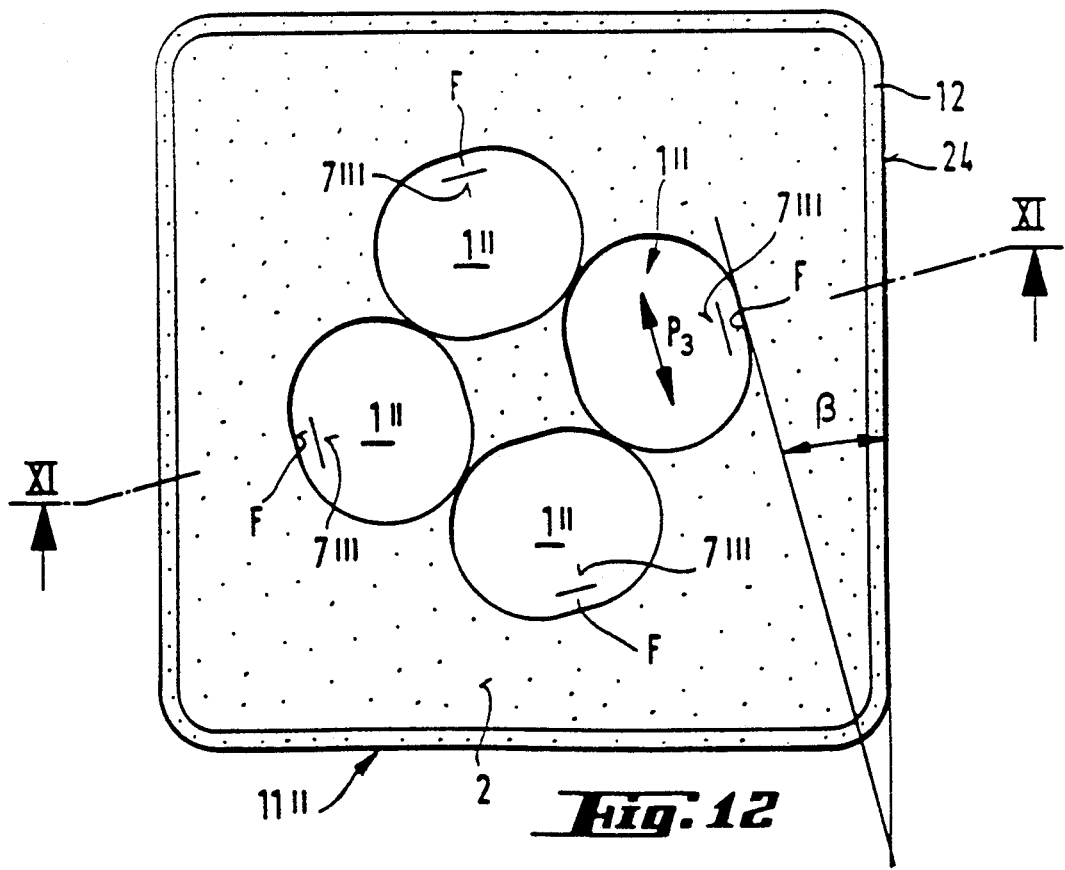
FIG. 12 is a top view of a cutting insert according to FIG. 11.

An additional version of the embodiment of the clamping indentation is represented in FIGS. 11 and 12 where the surface of revolution, 7''' forms the clamping indentation 1'', is formed by of a cylinder 35 with a superimposed hemispherical head 36 whose center P$_3$ moves in a plane parallel to the top surface 2 of the cutting insert 11. A portion F of the cylinder 35 at the same time passes below the top surface 2 of the cutting insert 11'', so that in this portion of the clamping depression 1''a ramp is formed with the angle $\alpha''$.

Figure 7:
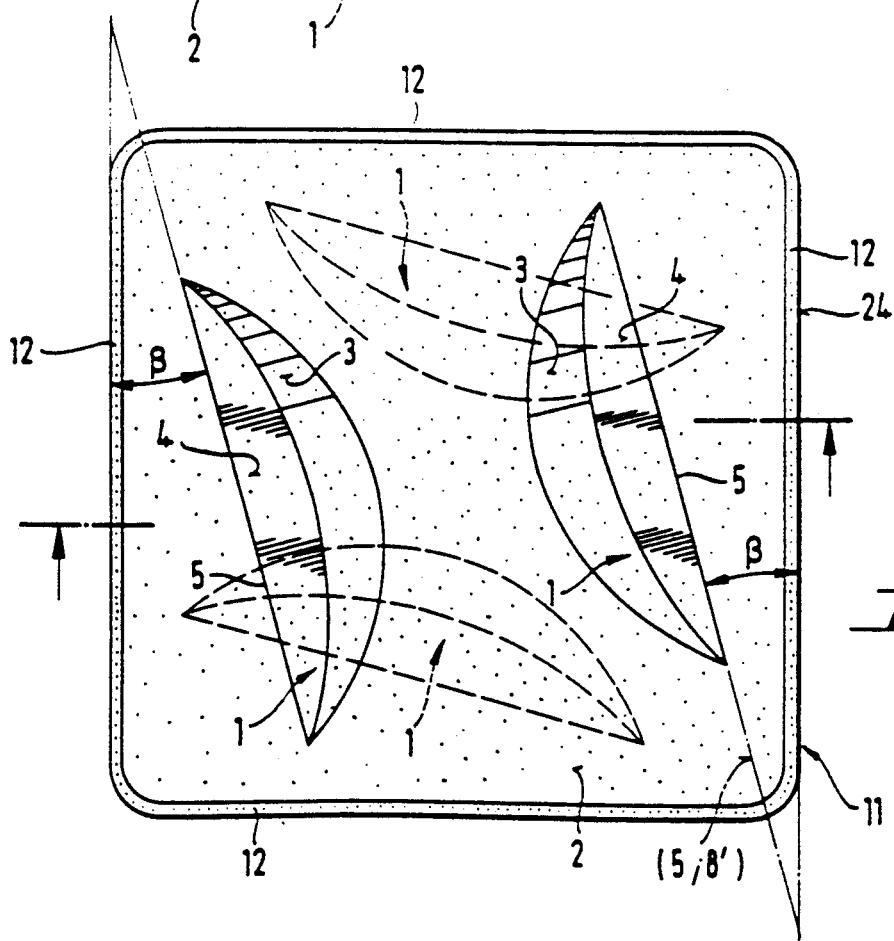
FIG. 7 is a top view of the cutting insert of FIG. 6.

The figures all depict cutting inserts having square top surfaces which meet the adjacent end surfaces to form the cutting edges of the insert. In FIG. 7 each planar surface 4 is in the form of a section of a circle having a radius 0.2 to 0.5 times the radius of a circle 29 inscribed by the cutting edges 28. In FIG. 9, where each indentation is formed by a rotating ellipsoid, the ellipsoid is formed by an ellipse having a major radius 1.2 to 1.5 times the radius of a circle 29 inscribed by the cutting edges 28 and a minor radius 0.25 to 0.5 times the radius of the inscribed circle. In FIG. 12, where each indentation is formed by a rotating solid with a cylindrical portion and a hemispherical end portion, the cylindrical portion has a radius 0.8 to 1.5 times the radius of a circle 29 inscribed by the cutting edges 28.

I claim:

1. A high speed milling or drilling tool comprising
a rotatable head having an axis of rotation, a circumferential surface radially spaced from said axis, an axial end transverse to said axis, and at least one channel opening onto said circumferential surface and said axial end, at least one cutting insert holder received in a respective said at least one channel, said holder being adjustably mounted in said channel for movement in a direction X which is at an angle $\delta$ to said axis, said holder having a cutting insert pocket with a bottom wall and two perpendicular sidewalls, said pocket being open opposite said bottom wall and said sidewalls, one of said sidewalls lying opposite said circumferential surface at an angle $\omega$ to said direction X, said holder further comprising dog means for retaining an insert in said pocket, and a cutting insert received in said pocket and having a pair of parallel top surfaces bounded by four orthogonal end surfaces, one of said top surfaces being received against the bottom wall of said pocket, two of said end surfaces being received against said sidewalls of said pocket, said insert further having in each top surface at least one elongate clamping indentation formed as a surface of rotation having a plane of symmetry and a longitudinal axis which is perpendicular to said plane of symmetry, each indentation in each top surface lying adjacent of different end surface and having a clamping surface which is parallel to the longitudinal axis and opposes the adjacent end surface, said longitudinal axis lying at an angle $\beta$ to the adjacent end surface and at an angle of 90°−$\epsilon$ to the direction X,, where $\epsilon=\beta+\omega$ and $\beta$ is between 13° and 32°, whereby, upon clamping said dog means to bear against said clamping surface of an indentation, the perpendicular end surfaces will be drawing against the sidewalls of the pocket, said insert being reversible to expose a different end surface by clamping the indentation in the opposite side.

2. A tool as in claim 1 wherein one top surface of said insert has two said indentations therein, the longitudinal axis of each indentation lying at the same angle $\beta$ to the respective adjacent end surface.

3. A tool as in claim 2 wherein both top surfaces of said insert each have two said indentations therein.

4. A tool as in claim 2 wherein said one top surface of said insert has four said indentations therein, the longitudinal axis of each indentation lying at the same angle $\beta$ to the respective adjacent end surface.

5. A tool as in claim 4 wherein both top surfaces of said insert each have four said indentations therein, the longitudinal axis of each indentation lying at the same angle $\beta$ to the respective adjacent end surface.

6. A tool as in claim 1 wherein said clamping surface in each indentation lies at an angle $\alpha$ between 15° and 45° to the top surface having the respective indentation, whereby said dog means can urge said insert against the bottom of the pocket.

7. A tool as in claim 1 wherein said surface of rotation is formed by a rotating cylinder, whereby said indentation is formed with a curved surface and a planar surface in the form of a section of a circle.

8. A tool as in claim 7 wherein said planar surface lies opposed to the adjacent end surface and thereby serves as said clamping surface.

9. A tool as in claim 7 wherein each top surface is square in shape and meets said four end surfaces at four respective cutting edges, the planar surface being in the form of a section of a circle having a radius 0.2 to 0.5 times the radius of a circle inscribed by the cutting edges.

10. A tool as in claim 1 wherein each indentation is formed by a rotating ellipsoid.

11. A tool as in claim 10 wherein each top surface is square in shape and meets said four end surfaces at four respective cutting edges the ellipsoid being formed by an ellipse having a major radius 1.2 to 1.5 times the radius of a circle inscribed by the cutting edges and a minor radius 0.25 to 0.5 times the radius of said inscribed circle.

12. A tool as in claim 1 wherein each said indentation is formed by a rotating solid with a cylindrical portion and a hemispherical end portion, said surface of revolution comprising a section of a sphere and a section of a cylinder.

13. A tool as in claim 12 wherein each top surface is square in shape and meets said four end surfaces at four respective cutting edges the cylindrical portion has a radius 0.8 to 1.5 times the radius of a circle inscribed by the cutting edges.

14. A tool as in claim 1 wherein the angle $\delta$ is 0°.

15. A tool as in claim 1 wherein the indentation has a depth of 1.2 to 3.8 mm.

16. A tool as in claim 1 wherein each top surface is square in shape and meets said four end surface at four respective cutting edges.

* * * * *

UNITED STATES PATENT AND TRADEMARK OFFICE
CERTIFICATE OF CORRECTION

PATENT NO. : 5,033,916

DATED : July 23, 1991

INVENTOR(S) : Claus Dunklau

It is certified that error appears in the above-identified patent and that said Letters Patent is hereby corrected as shown below:

Column 1, line 36, delete "85 27 925" and insert --85 27 924--.

Column 3, lines 11-12, delete "angle sum of the angles $\beta$ and" and insert --the sum of the angle $\beta$ and the angle $\omega$--.

Column 4, line 55, delete "drawing" and insert -- drawn --.

Signed and Sealed this

Fifteenth Day of June, 1993

Attest:

MICHAEL K. KIRK

*Attesting Officer*     Acting Commissioner of Patents and Trademarks